United States Patent [19]

Farris

[11] Patent Number: 4,632,215

[45] Date of Patent: Dec. 30, 1986

[54] DUAL-MODE HYDRAULIC VIBRATOR

[75] Inventor: Richard C. Farris, Dickinson, Tex.

[73] Assignee: Litton Resources Systems, Inc., Alvin, Tex.

[21] Appl. No.: 602,559

[22] Filed: Apr. 20, 1984

[51] Int. Cl.$^4$ .................... G01V 1/047; G01V 1/133
[52] U.S. Cl. .................................. 181/114; 181/119; 181/121; 181/401; 367/75; 367/189
[58] Field of Search ............... 181/0.5, 113, 114, 119, 181/120, 121, 140, 142, 400–402; 367/75, 143, 189, 190; 74/110, 520; 166/249; 73/663, 665, 662; 404/133; 37/DIG. 18

[56] References Cited

U.S. PATENT DOCUMENTS

| | | | |
|---|---|---|---|
| 3,053,351 | 9/1962 | Fulcher | 74/520 |
| 3,159,233 | 12/1964 | Clynch et al. | 181/0.5 |
| 3,306,391 | 2/1967 | Bays | 181/0.5 |
| 3,884,324 | 5/1975 | Hamilton et al. | 181/114 |
| 4,244,437 | 1/1981 | Falkerson | 181/114 |
| 4,291,780 | 9/1981 | Falkerson | 181/114 X |
| 4,321,981 | 3/1982 | Waters | 181/114 X |
| 4,354,572 | 10/1982 | Martin | 181/114 X |
| 4,421,198 | 12/1983 | Miller | 181/114 X |

FOREIGN PATENT DOCUMENTS 0714324  2/1980  U.S.S.R. .............................. 181/121

*Primary Examiner*—David H. Brown
*Assistant Examiner*—John E. Griffiths
*Attorney, Agent, or Firm*—Barry C. Kane

[57] ABSTRACT

A dual-mode vibrator for alternately injecting P-waves and S-waves in the earth including a hydraulically driven shaker assembly, a ground-contacting base plate, and a jacking means for raising and lowering the base plate relative to a vehicle. The shaker assembly is supported above, and coupled to the base plate by a supporting means. The supporting means has a first configuration for coupling the shaker assembly to the base plate for generating P-waves and a second configuration for pivotally coupling the shaker assembly to the base plate and to a rigid member associated with the vehicle for injecting S-waves.

4 Claims, 4 Drawing Figures

DUAL-MODE HYDRAULIC VIBRATOR

BACKGROUND OF THE INVENTION

1. Field of the Invention

This invention relates to a dual purpose, vehicle-mounted, vibrator for use in seismic exploration that can inject either compressional waves or shear waves into the earth using the same vibrator assembly.

2. Description of the Prior Art

As is well known in seismic surveys, large vibrators mounted on heavy-duty vehicles inject into the earth, a swept-frequency signal ranging from 5 to 180 Hz. These signals propagate downwardly, impinge upon various rock layers, and are reflected back to the surface. Seismic sensors coupled to the ground receive the reflected signals and convert them into electrical impulses that may be recorded for archival storage.

In general, seismic waves from a physical disturbance propagate through the earth in two modes. One mode is represented by a compressional or pressure (P) wave, wherein particle motion is parallel to the wave propagation direction. The second mode is a shear (S) wave, wherein particle motion is transverse to the wave propagation direction. Shear waves generated at the earth's surface may represent either motion parallel to the plane of the earth's surface or perpendicular thereto. In geophysical exploration, however, only shear waves generated parallel to the plane of the surface ($S_H$) are of use. In this description it will be assumed that all references to shear waves are restricted to $S_H$ or "horizontal" shear waves.

Both P and S wave types are used in seismic surveying. P-waves penetrate to great depths, but lose resolution of the thinner beds. S-waves on the other hand better resolve thin strata, but have limited penetration. A comparison of P-wave and S-wave data is a useful aid in determining certain rock characteristics.

The shaker assembly of a vibrator usually comprises an inertia mass of several hundred to several thousand pounds. The mass includes an internal cylinder within which is mounted a reciprocable piston. At least one piston rod interconnects the piston with a ground contacting base plate. A well known hydraulic servo valve introduces high pressure hydraulic fluid alternately to opposite sides of the piston within the inertia-mass cylinder. Reciprocation of the piston and piston rod relative the inertia mass causes the base plate to shake the ground. It should be understood that the axis of motion of the shaker assembly is mounted vertically for P-wave generation. See for example U.S. Pat. No. 3,306,391 issued to Bays, Feb. 28, 1967.

S-waves are induced in a manner similar to that for P-waves except the axis of motion of the shaker assembly is oriented horizontally, hence the reciprocating motion is also horizontal. The shaker assembly is rigidly coupled horizontally between supports mounted on a base plate as taught by Clynch et al. (U.S. Pat. No. 3,159,233).

For the purpose of this disclosure, a vibrator assembly consists of a shaker, a base plate and supports therefor, a lifting mechanism and necessary compliant isolator means. A vibrator assembly is mounted to the chassis of a heavy-duty vehicle. A portion of the weight of the vehicle is used to apply a bias force to the vibrator base plate to prevent decoupling from the ground during operation. Usually the vibrator assembly is mounted on the vehicle by hydraulic jacks so the base plate can be lowered to the ground, or raised to clear the ground for transport. Compliant means such as airbags couple the base plate to the hydraulic jacks. The compliant means isolate the vehicle from vibrations caused by the reciprocating base plate, yet allow the bias force of the vehicle to be applied to the base plate.

Heretofore it was necessary to provide separate shaker assemblies, one for P-wave and one for S-wave generation. Because the shaker assemblies are very heavy, separate vehicles were usually required to handle them.

It is the purpose of this invention to provide a single, dual-mode vibrator/shaker assembly that can be carried by a single vehicle and that can be used to generate either P-waves or S-waves at the option of the user.

SUMMARY OF THE INVENTION

This invention comprises a single, dual-mode vibrator assembly, which at the option of the user, will generate either P-waves or S-waves in the earth. The vibratory assembly includes first and second linkage-bar configurations that couple a shaker to a ground-contacting base plate.

In the first configuration, a set of paired linkage bars are pivotally coupled to the front and back lower portions of the shaker. The linkage bars are spread apart in an inverted-V configuration and are coupled to a base plate by anchor straps. When the shaker is actuated, the vertical reciprocating motion of the shaker is transmitted directly to the base plate. Since both sets of linkage bars are coupled to the base plate, they cannot spread apart. Hence, the base plate must move along in the same vertical axis as the shaker, thereby generating P-waves in the earth.

In a second configuration, the linkage bars are pivotally coupled to the front and back lower portions of the shaker as before. One bar in each set is pivotally coupled to the base plate by the anchor straps. But the other bar of the set and the pivotally coupled anchor strap are disconnected from the base plate and are refastened to a rigid member associated with the transport vehicle isolated from the base plate. When the shaker is actuated, the vertical reciprocating motion of the shaker forces the linkage bars to alternately spread apart and retract in a scissor-like fashion. Since one linkage bar in each set is firmly anchored to a rigid member, the other linkage bar, coupled to the base plate, forces the base plate to reciprocate sideways along a horizontal axis.

BRIEF DESCRIPTION OF THE DRAWINGS

A better understanding of the benefits and advantages of my invention may be obtained from the appended detailed description and the drawings wherein.

DETAILED DESCRIPTION OF THE PREFERRED EMBODIMENT

Figure 1:
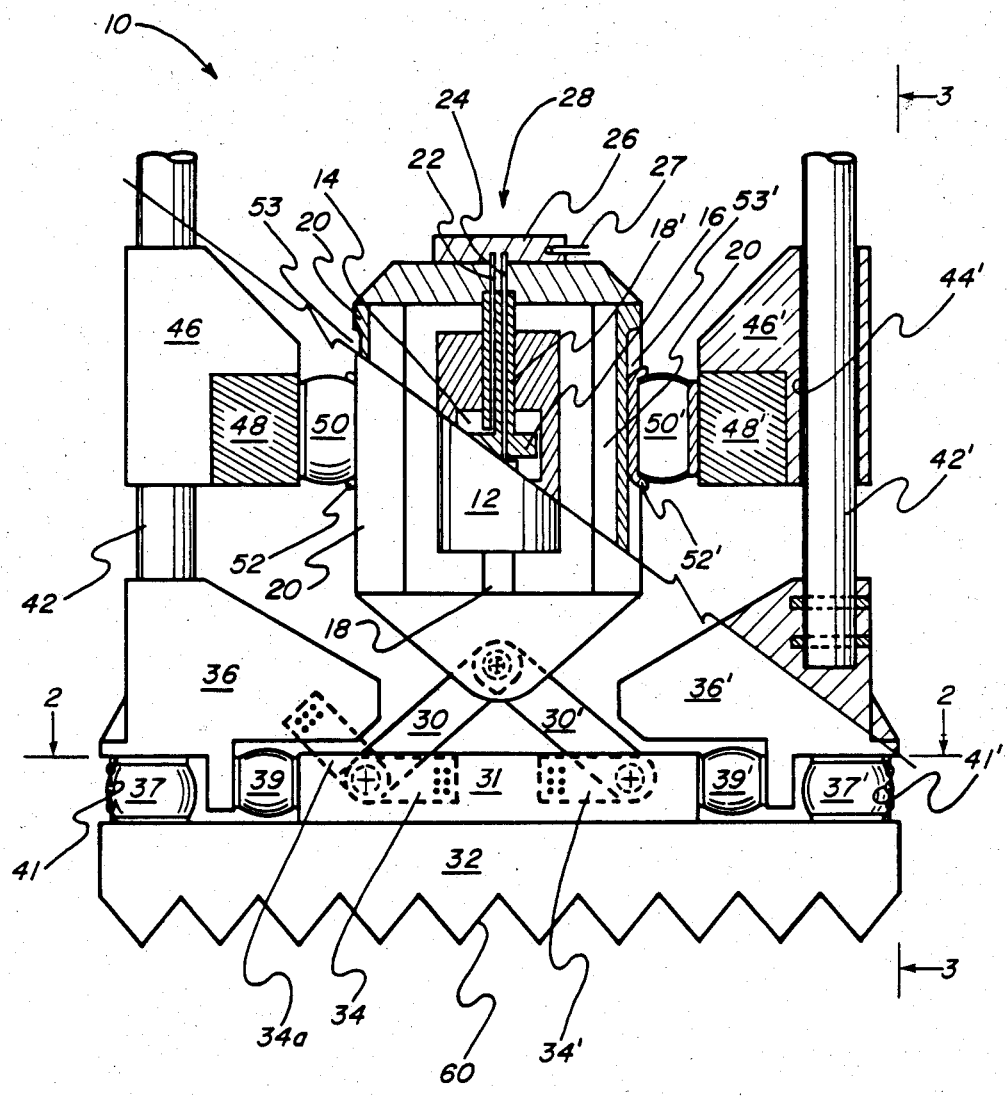
FIG. 1 is a diagrammatic front view of the dual-mode vibrator assembly of this invention.

FIG. 1 is a diagrammatic front view of a vibrator assembly 10 as seen in partial cut-away section. An inertia mass 12 has an internal cylinder 14 bored therethrough to slidably receive piston 16. Piston 16 is centrally disposed between oppositely extending piston rods 18, 18'. The upper and lower ends of rods 18, 18' are rigidly interconnected by frame 20. Pressurized hydraulic fluid is introduced alternately to each side of piston 16 by way of hydraulic-fluid conduits 22 and 24 disposed within upper piston rod 18'. The upper ends of conduits 22 and 24 are connected to a conventional hydraulic servo valve 26. Servo valve 26 is driven by a conventional servo control system (not shown) to admit hydraulic fluid under pressure from a source (not shown), through conduit 27. It is well known that the alternate introduction of hydraulic fluid under pressure to each side of piston 16 will result in the reciprocation of piston 16, piston rods 18, 18' and frame 20 relative to inertia mass 12. Hereafter the above assembly (12 through 27) will be collectively referred to as a shaker assembly 28.

Coupled to the front and back, lower central portion of shaker assembly 28 is a set of paired linkage bars 30, 30'. The rear linkage bars are not visible in FIG. 1. Linkage bars 30, 30' are pivotally coupled to base plate 32 by anchor straps 34, 34' supporting the shaker assembly 28 thereabove. It should be understood that anchor strap 34' is coupled permanently to flanges generally indicated as 31 extending from the top of base plate 32, and together with linkage bar 30' comprises a first linkage. Anchor strap 34 may be coupled either to flanges 31 or to a rigid member such as structural foot 36 by rotating anchor strap 34 to position shown by 34a and together with linkage bar 30, comprises a second linkage.

Base plate 32 is coupled to, yet isolated from structural feet 36, 36' by compliant means such as airbags 37, 37', 38, 38', 39, 39', 40, 40' and chains 41, 41', 41'', 41''' (airbags 38, 38' and 40, 40' and chains 41'', 40''' are not visible in FIG. 1). Airbags 37, 37', and 38, 38' (not visible) absorb vibrations resulting from vertical reciprocation of base plate 32. Airbags 39, 39', and 40, 40' (not visible) absorb vibrations resulting from horizontal reciprocation of base plate 32.

Structural feet 36, 36' are rigidly connected to columns 42, 42', 42'', and 42''' (42'', 42''' not visible). Columns 42 through 42''' are slidably received by column guide cylinders 44, 44', 44'' and 44''' secured within vibrator frame 46, 46'. Only column guide cylinder 44' is shown in FIG. 1. Vibrator frame 46, 46' is rigidly connected to and rests upon opposite sides of vehicle chassis 48, 48'.

Firmly anchored to vehicle chassis 48, 48' are compliant airbags 50, 50', 50'' and 50''' (50'', 50''' not visible) that slidably guide shaker assembly 28 between wear shoes 52, 52', 52'', 52''' (52'', 52''' not visible). Wear shoes 52, 52', 52'', 52''' follow vertical tracks 53, 53', 53'', 53''' (53'', 53''' not visible) along the sides of shaker assembly 28. Airbags 50–50''' and wear shoes 52–52''' provide means for laterally supporting shaker assembly 28, while allowing shaker assembly 28 one degree of vertical freedom relative to airbags 50–50'''. That freedom of movement is required so that base plate 32 and shaker assembly 28 can be lowered to the ground for operation by lifting jacks such as 43' shown in FIG. 3 and later raised clear of the ground for transport.

Figure 2:
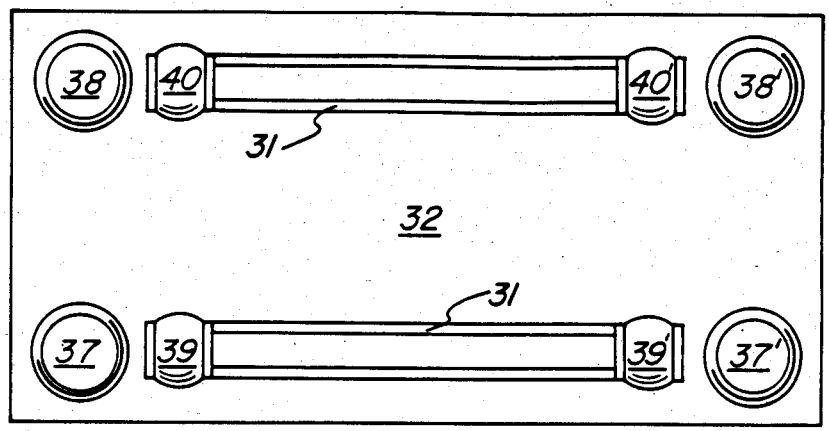
FIG. 2 is a diagrammatic top view of the base plate and airbag positions.

FIG. 2 is a plan view of base plate 32 alone showing symmetrical distribution of vertical airbags 37, 37' and 38, 38', and horizontal airbags 39, 39' and 40, 40'.

Figure 3:
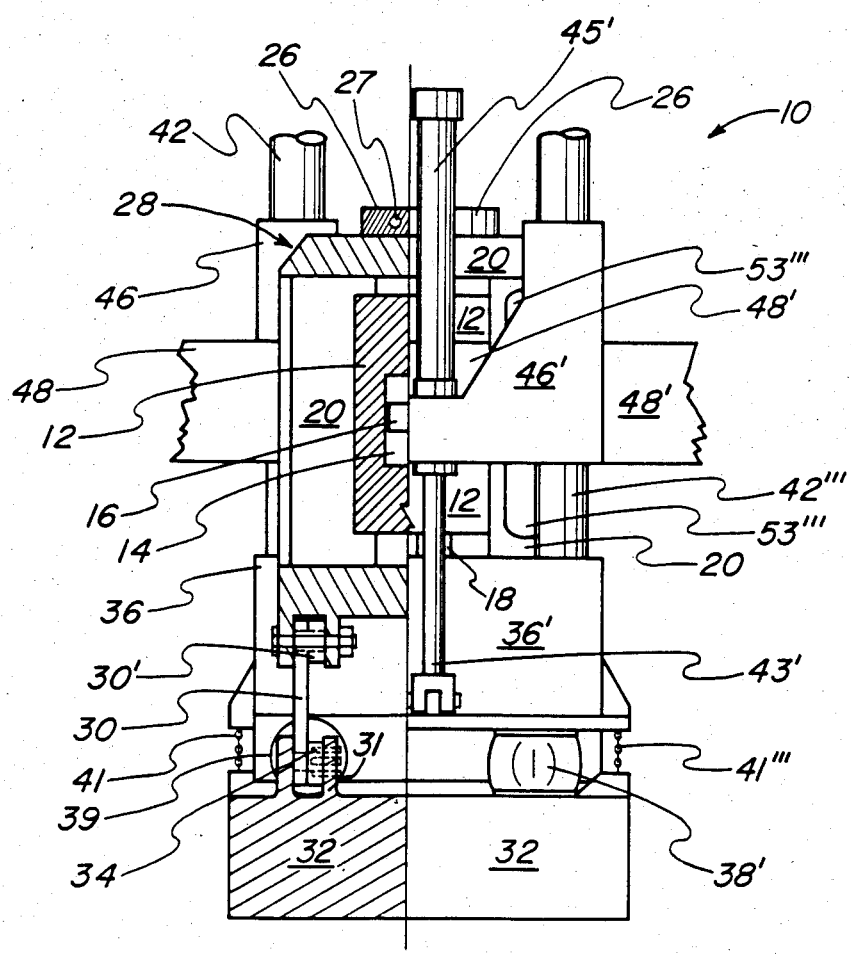
FIG. 3 is a diagrammatic side view of FIG. 1 seen in half-section.

FIG. 3 is a diagrammatic side view of vibrator assembly 10 in partly cut-away section. Shaker assembly 28 is pivotally-coupled by linkage bars 30, 30' (30' is partially shown) and anchor straps 34, 34' (34' not shown) to flanges 31 extending from base plate 32. Base plate 32 is compliantly coupled to structural feet 36, 36' as previously described. In the raised position, base plate 32 is suspended from structural feet 36, 36' by chains 41, 41', 41'', 41''' to prevent rupture of airbags 37, 37' through 40, 40' previously described. Only chains 41, 41''' and airbags 38' and 39 are shown in FIG. 3. Coupled to structural feet 36, 36' are columns 42–42''' mentioned previously and lifting jacks 43, 43' (42', 42'', and 43 not visible in FIG. 3). Columns 42–42''' are slidably received by column-guide cylinders (not visible) as previously described. Hydraulic jack 43' is received by hydraulic jack cylinder 45', which is centrally mounted to vibrator frame 46'. The vibrator frame 46, 46' supports shaker assembly 28 as well as attached base plate 32. Vibrator frame 46, 46' in turn rests upon, and is coupled to, vehicle chassis 48, 48' as previously described.

Figure 4:
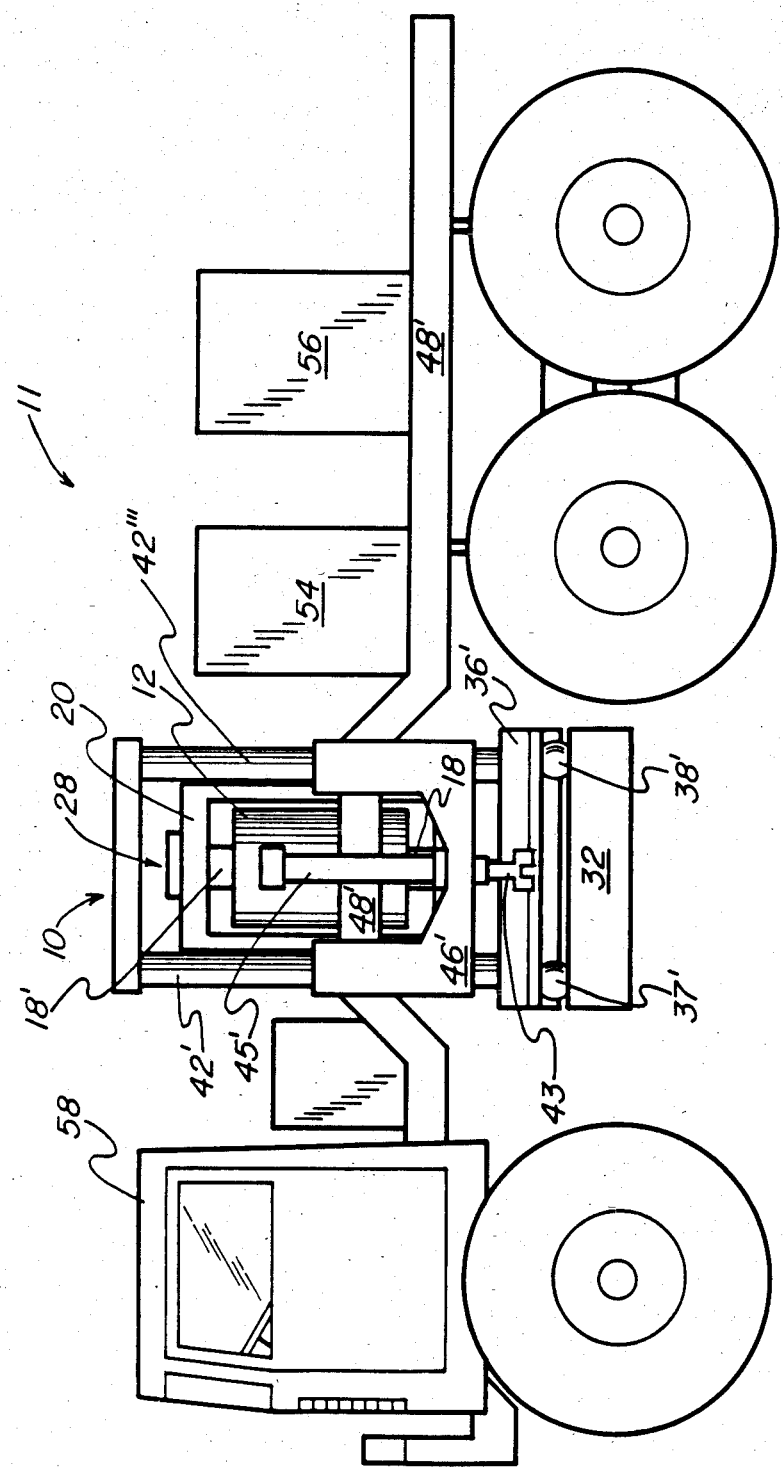
FIG. 4 is an overall view of the vibrator assembly mounted on a transport vehicle.

FIG. 4 is an overall view of the vibrator assembly 10 mounted on a transport vehicle 11. Vehicle 11 includes a hydraulic pump unit 54 driven by engine 56 to provide hydraulic power to shaker assembly 28 and lifting jacks such as 43'. A driver's cab 58 is provided wherein may be mounted controls for operating vibrator assembly 10.

In operation, vibrator assembly 10 is transported to a desired location by vehicle 11 where the vibrator assembly 10 is lowered to the ground by lifting jacks 43, 43'. Referring to FIG. 1, P-waves may be generated when shaker assembly 28 is coupled to base plate 32 by securing the first and second linkages, that is to say linkage bars 30, 30' and anchor straps 34, 34' to flanges 31. In the P-wave generating configuration, when vibrator assembly 10 is actuated, vertical reciprocating motion of shaker assembly 28 is transmitted directly to base plate 32 through linkage bars 30, 30'. Since linkage bars 30, 30' are rigidly coupled to base plate 32 and cannot spread apart, base plate 32 necessarily moves vertically, thereby to generate P-wave signals in the earth.

In a second S-wave-generating configuration, the first linkage such as 30' remains pivotally coupled to base plate 32 by anchor strap 34' as shown in FIG. 1. The second linkage such as 30 and anchor strap 34 are disconnected from flanges 31, rotated upwards, and anchor strap 34 is refastened to a rigid member such as structural foot 36 as illustrated by anchor strap 34a. In that configuration, reciprocating vertical travel of shaker assembly 28 forces horizontal reciprocating travel of base plate 32. Downward movement (for example) of shaker assembly 28 forces the lower ends of linkage bars 30, 30' to spread apart in a scissor-like fashion, forcing base plate 32 to move horizontally. Teeth 60 coupled to the bottom of base plate 32 engage the ground surface so that horizontal movement of the base plate will shake the earth horizontally to generate S-waves.

For illustrative purposes, my invention has been described with a certain degree of specificity. For example, but not by way of limitation, the invention is mounted on a self-propelled vehicle, but may be mounted on a trailer, swamp-buggy, supporting frame, or other suitable device. Variations will occur to those skilled in the art but which may be included within the scope and spirit of this invention which is limited only the appended claims.

I claim as my invention:

1. A dual-mode vibrator assembly mounted on a support vehicle, for alternatively generating P waves or S waves in the earth, said vibrator assembly having a shaker assembly disposed above a base plate, means for compliantly coupling said base plate to a plurality of columns and a lifting-jack means for raising and lowering said base plate relative to said support vehicle, comprising:

a rigid member interconnecting said plurality of columns and said lifting jack means to said means for compliantly coupling said base plate; and linkage means for coupling said shaker assembly to said base plate in a first configuration to generate P waves, and for coupling said shaker assembly to said base plate and to said rigid member in a second configuration to generate S waves;

said linkage means including a first and a second linkage-bar set, each set having a first and a second linkage bar and each linkage bar having a first and a second end, said first end of said first and second linkage bar in each set coupled to said shaker assembly; and said linkage means further including a strap for coupling said second end of said first and second linkage bar in each set to said base plate in said first configuration for generating P waves, and on the alternative, for coupling said second end of said first linkage bar in each set to said base plate and for coupling said second end of said second linkage bar in each set to said rigid member in said second configuration for generating S waves.

2. The dual-mode vibrator assembly as defined in claim 1 further comprising:

compliant means for laterally supporting said shaker assembly in sliding relationship with respect to said support vehicle.

3. The dual-mode vibrator assembly as defined in claim 2, wherein said compliant means, comprises:

a plurality of vertical tracks provided on said shaker assembly;

a plurality of wear shoes slideably disposed within said tracks; and means for compliantly coupling said plurality of wear shoes to said support vehicle.

4. The dual-mode vibrator assembly as defined in claim 3, wherein said shaker assembly is disposed above said base plate such that it reciprocates only along a vertical axis.

* * * * *